United States Patent
Ariga et al.

(10) Patent No.: US 6,785,319 B1
(45) Date of Patent: Aug. 31, 2004

(54) ULTRAVIOLET LASER DEVICE

(75) Inventors: Tatsuya Ariga, Hiratsuka (JP);
Takahito Kumazaki, Hiratsuka (JP);
Jun Akita, Oyama (JP); Noritoshi Itoh,
Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/926,662

(22) PCT Filed: Jun. 1, 2000

(86) PCT No.: PCT/JP00/03560

§ 371 (c)(1),
(2), (4) Date: Feb. 7, 2002

(87) PCT Pub. No.: WO00/74183

PCT Pub. Date: Dec. 7, 2000

(30) Foreign Application Priority Data

Jan. 6, 1999 (JP) .......................... 11/153313

(51) Int. Cl.⁷ ............................................. H01S 3/08
(52) U.S. Cl. .................. 372/99; 372/100; 372/101; 372/103; 372/108
(58) Field of Search .................. 372/99, 100, 101, 372/103, 108, 55, 56, 57, 104, 58, 19, 25, 30

(56) References Cited

U.S. PATENT DOCUMENTS

| | | | | |
|---|---|---|---|---|
| 3,980,397 A | * | 9/1976 | Judd et al. .................. | 350/162 |
| 4,362,364 A | * | 12/1982 | Smith .......................... | 350/358 |
| 5,761,236 A | | 6/1998 | Kleinschmidt et al. | |
| 6,008,914 A | * | 12/1999 | Sasagawa et al. ............ | 359/15 |
| 6,526,086 B1 | * | 2/2003 | Wakabayashi et al. ........ | 372/69 |
| 6,560,269 B1 | * | 5/2003 | Takehisa et al. ............ | 372/103 |
| 6,731,666 B1 | * | 5/2004 | Kumazaki et al. ............ | 372/99 |

FOREIGN PATENT DOCUMENTS

| | | | | |
|---|---|---|---|---|
| EP | 0 817 338 | 1/1998 | | |
| JP | 50-57646 | 5/1975 | | |
| JP | 61-135497 | 6/1986 | | |
| JP | 61-224475 | 10/1986 | | |
| JP | 62-209881 | 9/1987 | | |
| JP | 62-234384 | 10/1987 | | |
| JP | 4-80981 | 3/1992 | | |
| JP | 4-314374 | 11/1992 | | |
| JP | 5-390 | 1/1993 | | |
| JP | 5-167172 | 7/1993 | | |
| JP | 5-390 | * 8/1993 | ............. | H01S/3/04 |
| JP | 5-235453 | 9/1993 | | |
| JP | 6-152017 | 5/1994 | | |
| JP | 6-164030 | 6/1994 | | |
| JP | 8-111551 | 4/1996 | | |
| JP | 08111551 | * 4/1996 | ............. | H01S/3/08 |
| JP | 10-313143 | 11/1998 | | |

* cited by examiner

Primary Examiner—David Vu
Assistant Examiner—Armando Rodriguez
(74) Attorney, Agent, or Firm—Armstrong, Kratz, Quintos, Hanson & Brooks, LLP.

(57) ABSTRACT

A narrow band ultraviolet laser device which can restrict a change in temperature gradient at light transmitting sections and maintain laser light at a high grade. To this end, the ultraviolet laser device includes light shielding elements (37A to 37C) having light transmitting sections (47A to 47C) each constituted by an opening for transmitting laser light (11), and light shielding sections (49A to 49C) that surround the light transmitting sections (47A to 47C), remove an undesired laser light (11A) from an optical path and shape the laser light (11) into a predetermined form, wherein heating means (45) for heating the light transmitting sections (47A to 47C) are provided in the vicinity of the light shielding elements (37A to 37C).

8 Claims, 5 Drawing Sheets

ULTRAVIOLET LASER DEVICE

TECHNICAL FIELD

The present invention relates to a narrow band ultraviolet laser device.

BACKGROUND ART

In an ultraviolet laser device, an art of band-narrowing, which narrows a spectral bandwidth of laser light and stabilize its center wavelength by mounting a wavelength selection element in a resonator, is conventionally known (Refer to, for example, Japanese Patent Laid-open No. 10-313143).

Hereinafter, the prior art will be explained with an excimer laser device as an example. FIG. 7 is an explanatory block diagram of a narrow band excimer laser device 1 according to the prior art. In FIG. 7, the excimer laser device 1 includes a laser chamber 2 with a laser gas being sealed therein, and a band-narrowing unit 10 for narrowing a bandwidth of laser light 11 oscillated from this laser chamber 2. The laser light 11 oscillated by electric discharge inside the laser chamber 2 is incident on the band-narrowing unit 10 provided outside and behind the laser chamber 2.

The laser light 11 incident on the band-narrowing unit 10 is expanded by prisms 32 and 32, and is incident on a grating 33. Only the laser light 11 with a predetermined wavelength is returned in the same direction as the incident light by the grating 33, then it is incident on the laser chamber 2 again and is emitted from a front mirror 8. Subsequently, it is incident on a processing machine 15 to be a light source for performing precision machining inside it.

In this situation, part of the laser light 11 sometimes hits on end portions of the prisms 32 and the grating 33 inside the band-narrowing unit 10. When such reflected light the bandwidth of which is not narrowed (this is called undesired laser light 11A) returns to the laser chamber 2, optical quality of the laser light 11 such as a center wavelength, spectral bandwidth, and the like is degraded. Further, as a result that the laser light 11 is incident on an optical component from the surfaces other than a predetermined incident surface, heat sometimes generates and thereby the optical component is deformed. Furthermore, when the laser light 11 is incident on the grating 33 at the angles other than a predetermined incident angle, wavelength selection by the grating 33 is not favorably performed, and thereby the optical quality of the laser light 11 is degraded.

In order to avoid the above, a first light shielding element 37A for removing the undesired laser light 11A is provided at a position where the laser light 11 is incident on the band-narrowing unit 10, and a second light shielding element 37B is provided inside the band-narrowing unit 10. Further, a third light shielding element 37C is provided inside the front mirror 8 to shape a beam form of the laser light 11 into a predetermined form suitable for processing.

FIG. 8 shows the forms of the light shielding elements 37A to 37C. In FIG. 8, the light shielding elements 37A to 37C have light shielding sections 49A to 49C in a plate form for removing the undesired laser light 11A, and light transmitting sections 47A to 47C constituted by rectangular openings for transmitting the laser light 11, respectively. When the laser light 11 is radiated to the light shielding elements 37A to 37C, the undesired laser light 11A hit on the light shielding sections 49A to 49C is irregularly reflected, then deviated from an optical path, and is absorbed in a cover or the like not shown for covering the excimer laser device 1. The residual laser light 11 passes through the light transmitting sections 47A to 47C, and is shaped into a rectangular beam form.

However, the above-described prior art has the disadvantages as described below.

Specifically, according to the prior art, there is no description regarding the material of the light shielding elements 37A to 37C, and metal is generally used. When the laser light 11 is radiated to the light shielding elements 37A to 37C, part of it is absorbed in the light shielding sections 49A to 49C, and the light shielding sections 49A to 49C are beginning to have heat. In this situation, gases, such as, for example, air and an inert gas exist inside the light transmitting sections 47A to 47C. Accordingly, temperature gradient occurs to the gases as a result of heat generation from inner edges 50A to 50C of the light shielding sections 49A to 49C. Specifically, the temperature of the gases near the inner edges 50A to SOC of the light transmitting sections 47A to 47C rises to be high, but the temperature of the gases near a center does not rise so much.

As a result, indexes of refraction of the light transmitting sections 47A to 47C become nonuniform, and the gases act as if they were lenses, whereby a wavefront of the laser light 11 passing through the light transmitting sections 47A to 47C is distorted. Thus, there arises the disadvantage that the beam form of the laser light 11 emitted from the excimer laser device 1 is distorted or the spectral bandwidth is increased, thereby degrading the quality of the laser light 11, and processing is not favorably performed.

Further, temperature gradient hardly exists at the time of the start of the laser oscillation, but as the laser light is oscillated for a long period of time, the temperature gradient occurs to balance, and therefore the indexes of refraction of the light transmitting sections 47A to 47C at the time of the start of the oscillation changes after a lapse of long period of time. Thus, even if the incident angle of the laser light 11 onto the grating 33 is adjusted so that the optical quality becomes favorable at the time of start of oscillation, the wavefront is distorted with a lapse of time, and the optical quality is degraded. Further, there exists the disadvantage that the beam form and the beam center position are varied to give an adverse effect on processing.

DISCLOSURE OF THE INVENTION

The present invention is made in view of the above-described disadvantages, and its object is to provide a narrow band ultraviolet laser device which can restrict a change in temperature gradient at light transmitting sections and maintain laser light at a high grade.

In order to attain the above-described object, a first aspect of an ultraviolet laser device according to the present invention is a narrow band ultraviolet laser device comprising light shielding elements having light transmitting sections each constituted by an opening for transmitting laser light, and light shielding sections that surround the light transmitting sections, remove undesired laser light from an optical path and shape the laser light into a predetermined form, and includes the constitution in which healing means for heating the light transmitting sections are included in the vicinity of the light shielding elements.

According to the above constitution, the heating means for heating the light transmitting sections are included in the vicinity of the light shielding elements. Consequently, gases inside the light transmitting sections are entirely heated and become substantially uniform in temperature, thus making it possible to reduce temperature gradient of the gases inside the light transmitting sections, which occurs when the laser light is radiated to the light shielding plate. Accordingly, ununiformity in the indexes of refraction of the light transmitting sections is reduced, and therefore a wavefront is not distorted when the laser light passes through the light transmitting sections, thus making it possible to obtain the laser light at a high grade. Further, by heating the entire heat shielding elements in advance, a change in the indexes of refraction of the light transmitting sections between the time of starting laser light oscillation and the time after a lapse of time can be reduced. Accordingly, if the positions and the angles of the optical components in the band narrowing unit at the time of start of oscillation are adjusted, a change in the wavefront with a lapse of time is small, and the optical quality is not degraded.

Further, in the ultraviolet laser device, the heating means may also perform heating in a stale in which the laser light is not oscillated.

According to the above constitution, the temperature of the gases inside the light transmitting sections is already made substantially uniform when the laser light is oscillated, and therefore a change in the temperature of the gases immediately after the oscillation is reduced. Accordingly, the laser light at a high grade can be obtained with stability from the time immediately after the oscillation.

Further, the ultraviolet laser device may have the constitution including a laser controller for controlling laser oscillation, and temperature measuring devices for measuring temperature of gases inside the light transmitting sections, in which the temperature measuring devices give information regarding the temperature of the gases to the laser controller, and the laser controller starts laser oscillation based on the information.

According to the above constitution, laser oscillation is started based on the information regarding the temperature of the gases, for example, the information that the temperature of the gases inside the light transmitting sections is sufficiently high. Consequently, the temperature of the gases inside the light transmitting sections already rise and is made approximately uniform when the laser oscillation is started, and therefore the laser light is not influenced by a variation of the index of refraction caused by a change in temperature, thus making it possible to always obtain the laser light at a high grade.

A second aspect of the ultraviolet laser device according to the present invention is a narrow band ultraviolet laser device comprising light shielding elements having light transmitting sections for transmitting laser light, and light shielding sections that surround the light transmitting sections, remove undesired laser light from an optical path and shape the laser light into a predetermined form, and has the constitution in which spraying means for spraying an inert gas is included in the vicinity of the light shielding elements.

According to the above constitution, an inert gas is sprayed to the light shielding elements. Consequently, as the gases do not remain inside the light transmitting sections of the light shielding elements, the heated gases are always exchanged, and therefore the temperature gradient of the gases become gentle, thus reducing the refraction index gradient at the light transmitting sections. Accordingly, it hardly happens that the wavefront of the laser light is distorted, and the laser light can be maintained at a high grade. Further, for example, if the inert gas is cooled in advance, an increase in heat of the light shielding elements due to radiation of the laser light can be reduced to be small. Accordingly, the refraction index gradient at the light transmitting sections becomes small and distortion at the wavefront of the laser light becomes small.

A third aspect of the ultraviolet laser device according to the present invention is a narrow band ultraviolet laser device comprising light shielding elements having light transmitting sections for transmitting laser light, and light shielding sections that surround the light transmitting sections, remove undesired laser light from an optical path and shape the laser light into a predetermined form, and has the constitution in which the light shielding sections are formed of a material including at least any one of aluminum, aluminum alloy and copper.

According to the above constitution, the light shielding sections of the light shielding elements are formed of a material including any one of aluminum, aluminum alloy and copper with good heat conductivity. Consequently, when the laser light is radiated to the light shielding elements, generated heat is conducted in a short time. In addition to this, aluminum and aluminum alloy reflect the laser light at a high reflectivity, and thus the laser light is hardly absorbed in the light shielding elements. For these reasons, an increase in heat at the inner edges of the light shielding sections is very small, and therefore ununiformity of the temperature hardly occurs to the gases inside the light transmitting sections, whereby the indexes of refraction become uniform. Accordingly, disturbance of the wavefront does not occur when the laser light passes through the light transmitting sections, thus making it possible to maintain the optical quality of the laser light at a high grade.

A fourth aspect of the ultraviolet laser device according to the present invention is a narrow band ultraviolet laser device comprising light shielding elements having light transmitting sections for transmitting laser light, and light shielding sections that surround the light transmitting sections, remove undesired laser light from an optical path and shape the laser light into a predetermined form, and has the constitution in which the light shielding sections are formed of a material which transmits the laser light and have a function of removing the undesired laser light from the optical path.

Further, in the ultraviolet laser device, the removing function may be performed at total reflection coating formed on surfaces of the light shielding sections.

According to the above constitution, since the light shielding sections are formed of a material transmitting the laser light, such as, for example, CaF2, and synthetic fused silica, the laser light is not absorbed in the light shielding sections, and the light shielding sections hardly have heat. Accordingly, even if the gases are inside the light transmitting sections, the gases are not warmed and the indexes of refraction become uniform, whereby disturbance of the wavefront does not occur when the laser light passes through the light transmitting sections. Specifically, it is possible to maintain the optical quality of the laser light at a high grade. Further, by applying the total reflection coating to the surfaces of the light shielding sections, the laser light is reflected at high reflectivity, and thus the undesired laser light causing degradation of the quality of the laser light can be removed efficiently.

A fifth aspect of the ultraviolet laser device according to the present invention is a narrow band ultraviolet laser device comprising light shielding elements for removing undesired laser light from an optical path and shaping laser light into a predetermined form, and light transmitting sections formed by the light shielding elements, for transmitting the laser light, and has the constitution in which the light shielding elements are formed of a material which transmits the laser light, and have a function of removing the undesired laser light from the optical path.

Further, in the ultraviolet laser device, the removing function may be a function of refracting the laser light at the light shielding elements and guiding it outside from the optical path as the undesired laser light.

According to the above constitution, the light shielding elements are constituted by a substance transmitting the undesired laser light, and therefore, if the undesired laser light is refracted at the light shielding sections, this can be absorbed in, for example, an absorber and the like, whereby the undesired laser light does not return to the optical path. In addition, since the undesired laser light passes through the light shielding elements, heat is not absorbed in the light shielding elements.

A sixth aspect of the ultraviolet laser device according to the present invention is a narrow band ultraviolet laser device comprising light shielding elements having light transmitting sections for transmitting laser light, and light shielding sections that surround the light transmitting sections, remove undesired laser light from an optical path, and shape the laser light into a predetermined form, and has the constitution in which the light transmitting sections are formed of a solid which transmits the laser light.

According to the above constitution, the light transmitting sections are constituted by a solid which transmits the laser light, such as, for example, CaF2, synthetic fused silica and the like. Consequently, since gases do not exist in the light transmitting sections through which the laser light passes, temperature gradient of the gases doesn't occur. Further, since the light transmitting sections transmit the laser light at high transmissivity, it doesn't happen that the laser light is absorbed in the light transmitting sections and warmed. Accordingly, it never happens that the temperature gradient occurs to the light transmitting sections and the indexes of refraction become nonuniform, and therefore disturbance of the wavefront does not occur when the laser light passes through the light transmitting sections. In this situation, for example, if metal plates that reflect the laser light at high reflectivity or optical components with the total reflection coating being applied thereto are placed around the light transmitting sections as the light shielding sections, the undesired laser light causing degradation of the quality of the laser light can be efficiently removed. Accordingly, the optical quality of the laser light can be maintained at a high grade.

BEST MODE FOR CARRYING OUT THE INVENTION

Figure 1:
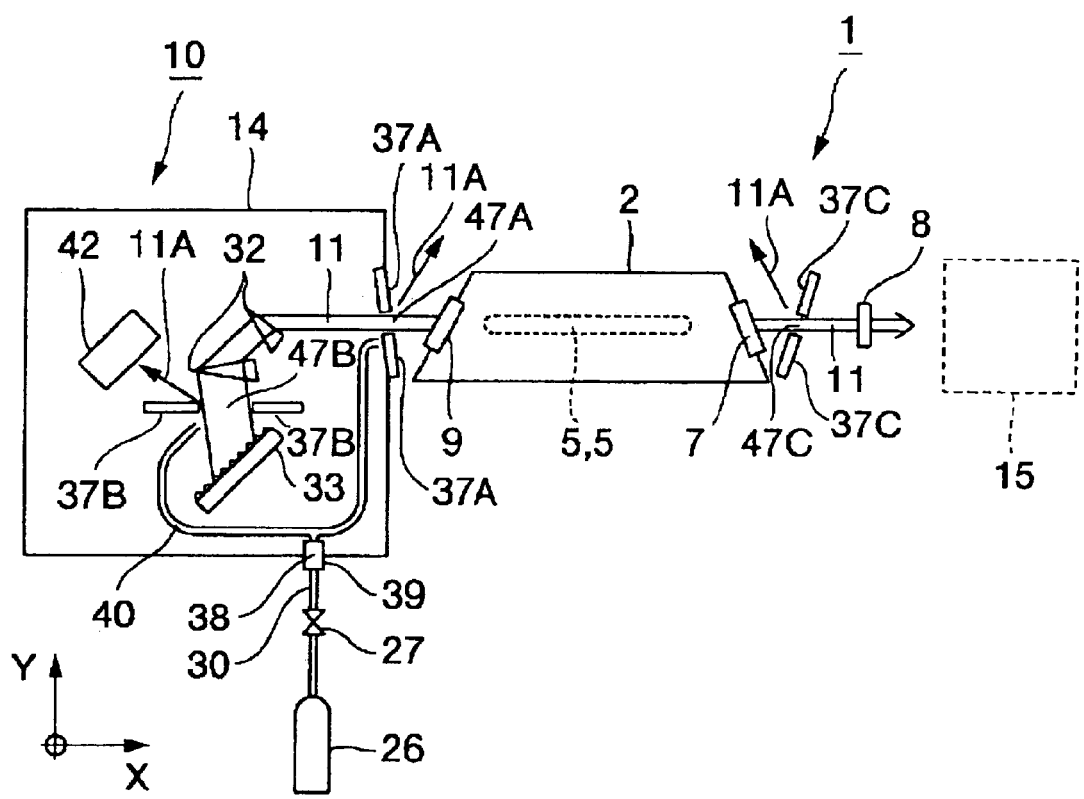
FIG. 1 is an explanatory block diagram of an excimer laser device according to a first embodiment of the present invention.

A preferred embodiment according to the present invention will be explained in detail below with reference to the drawings. In each embodiment, the same elements as in the drawing used for explaining the aforementioned prior art are given the identical numerals and symbols, and the redundant explanation will be omitted. In the embodiment below, the explanation is made with a KrF excimer laser device (hereinafter, abbreviated as an excimer laser device) cited as an example of an ultraviolet laser device.

Initially, a first embodiment will be explained based on FIG. 1. FIG. 1 shows a constitution of an excimer laser device 1 according to the present embodiment. In FIG. 1, the excimer laser device 1 includes a laser chamber 2 with a laser gas being sealed therein for causing electric discharge therein to oscillate laser light 11 in a vacuum ultraviolet range, and a band-narrowing unit 10 for narrowing a bandwidth of the laser light 11 oscillated from this laser chamber 2.

For example, fluorine (F2), krypton (Kr), and neon (Ne) are sealed inside the laser chamber 2 at a predetermined pressure ratio as a laser gas, and a pair of discharge electrodes 5 and 5 are placed at a predetermined position. By applying high voltage between the discharge electrodes 5 and 5 from a high voltage power supply not shown, the laser gas is excited by electric discharge, and the laser light 11 having a wavelength of about 248 nm is oscillated. In the excimer laser device 1 as in the above, high voltage is generally applied in a pulse form, and the laser light 11 is oscillated in a pulse form.

The laser light 11 generated in the laser chamber 2 passes through a rear window 9 provided at a rear end of the laser chamber 2, and is incident on the band-narrowing unit 10 provided outside and behind the laser chamber 2. The band-narrowing unit 10 is covered with a band-narrowing box 14 therearound and includes, for example, two prisms 32 and 32, and a grating 33 being a wavelength selection element therein.

The laser light 11 incident on an inside of the band-narrowing box 14 is expanded by the prisms 32 and 32, and is incident on the grating 33. Subsequently, only the laser light 11 with a predetermined wavelength is returned in the same direction as the incident light by the grating 33, and its bandwidth is narrowed. The laser light 11 is incident on the laser chamber 2 again, passes through a front window 7 provided at a front end of the laser chamber 2, and is emitted from a front mirror 8 provided in front of the laser chamber 2. Subsequently, it is incident on the processing machine 15 to be a light source for performing precision processing inside it.

A first light shielding element 37A for removing an undesired laser light 11A from an optical path is provided at an entrance of the band-narrowing box 14 on which the laser light 11 is incident, and a second light shielding element 37B is provided inside the band-narrowing unit 10, respectively. Further, a third light shielding element 37C is provided inside the front mirror 8 to shape a beam form of the laser light 11 into a predetermined form suitable for processing.

Figure 8:
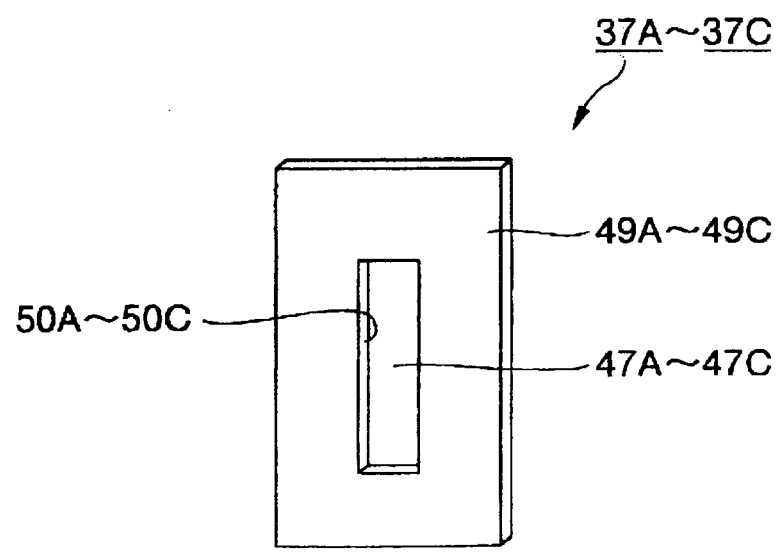
FIG. 8 is a diagram of a form of a light shielding element according to the prior art.

The forms of the light shielding elements 37A to 37C are the same as shown in FIG. 8. Specifically, the light shielding elements 37A to 37C have light shielding sections 49A to 49C in a plate form for removing the undesired laser light 11A, and light transmitting sections 47A to 47C each constituted by a rectangular opening for transmitting the laser light 11. The light shielding sections 49A to 49C of the light shielding elements 37A to 37C are formed of a material including a substance with high heat conductivity, for example, aluminum alloy or copper as a principal component.

The laser light 11 radiated to the light shielding elements 37A to 37C is shaped into a rectangular beam shape by passing through the light transmitting sections 47A to 47C. Further, the undesired laser light 11A hit on the light shielding sections 49A to 49C is reflected and deviated from the optical path and is absorbed in a cover and the like not shown for covering the excimer laser 1.

In this situation, the light shielding elements 37A to 37C are each placed to form a predetermined non-perpendicular angle with respect to an optical axis of the laser light 11 so that the undesired laser light 11A reflected at the light shielding sections 49A to 49C does not return to the laser chamber 2 to resonate inside a resonator. Thus, the undesired laser light 11A reflected at, for example, the first light shielding element 37A hit on an inner wall of the cover (not shown) for covering the excimer laser device 1 and is absorbed therein. Further, the undesired light 11A reflected at the second light shielding element 37B hits on an absorbing member 42 provided inside the band-narrowing box 14 and constituted by aluminum and the like, and it is irregularly reflected and is absorbed in an inner wall of the band-narrowing box 14. In this situation, it is preferable that the surface of the absorbing member 42 has a proper amount of irregularities so that the reflected undesired light 11A does not concentrate on one point on the inner wall of the band-narrowing box 14.

Specifically, the light shielding elements 37A to 37C include the light transmitting sections 47A to 47C in a predetermined form (a rectangle having a predetermined width and height in this embodiment), and shape the beam form of the laser light 11 passing through the light shielding elements 37A to 37C. The undesired laser light 11A is removed from the optical path by the light shielding sections 49A to 49C, whereby the laser light 11 is prevented from being radiated to the positions other than a predetermined position.

Further, these light shielding elements 37A to 37C prevent the laser light 11 from being incident on the grating 33 at the angles other than a predetermined incident angle. Consequently, the wavelength selection of the grating 33 is satisfactorily performed, thus making it possible to maintain light quality of the laser light 11 favorably. According to the present embodiment, the light shielding sections 49A to 49C of the light shielding elements 37A to 37C are constituted with a material having high heat conductivity such as copper and aluminum alloy as a principal component.

Consequently, even when the undesired laser light 11A is radiated to the light shielding sections 49A to 49C, heat generating at the inner edges 50A to 50C transfers to the surroundings in a short time and is dissipated, and thus an increase in heat of the inner edges 50A to 50C is very small. Therefore, ununiformity of temperature hardly occurs to the gases inside the light transmitting sections 47A to 47C, and the indexes of refraction become uniform. Consequently, even when the laser light 11 passes through the light transmitting sections 47A to 47C, disturbance of the wavefront does not occur, thus making it possible to maintain the optical quality of the laser light 11 at a high grade.

Further, in this case, it is more preferable to evaporate an aluminum film onto the surfaces of the light shielding sections 49A to 49C. Specifically, since aluminum has higher reflectivity with respect to an ultraviolet ray having a wavelength of the laser light 11, most of the undesired laser light 11A is reflected when the undesired laser light 11A is radiated to the light shielding sections 49A to 49C, and a rise in temperature of the inner edges 50A to 50C becomes very small. Therefore, the indexes of refraction inside the light transmitting sections 47A to 47C become uniform, and disturbance of the wavefront does not occur, thus making it possible to maintain the light quality of the laser light 11 at a high grade.

Alternatively, it is further preferable to apply nonreflective coating constituted by dielectric such as magnesium fluoride (MgF2) onto a surface of the aluminum film as described above. Specifically, when the undesired laser light 11A is repeatedly radiated to the aluminum film, the aluminum film is gradually deteriorated and the reflectivity thereof reduces, and the nonreflective coating has the effect of preventing it.

Further, the nonreflective coating may be applied without evaporating the aluminum film on the surface of the aluminum alloy. The aluminum alloy also has high reflectivity with respect to the laser light 11, the same effect is provided. Further, the light shielding sections 49A to 49C may be formed of aluminum.

Alternatively, the material of the light shielding sections 49A to 49C may be ceramic with low heat conductivity. Consequently, even if the laser light 11 is radiated to the light shielding elements 37A to 37C, the light shielding elements 37A to 37C are hardly heated, and therefore a rise in the temperature of the gases inside the light transmitting sections 47A to 47C is extremely reduced. Thus, the indexes of refraction of the light transmitting sections 47A to 47C become uniform, and disturbance does not occur to the wavefront, therefore making it possible to maintain the optical quality of the laser light 11 at a high grade.

Further, as another example, the material of the light shielding sections 49A to 49C may be a material for transmitting the laser light 11 with the ultraviolet ray wavelength at high transmissivity, such as synthetic fused silica, CaF2, and MgF2. According to this, even if the laser light 11 is radiated to the light shielding elements 37A to 37C, out of the laser light 11 which is incident on the light shielding elements 37A to 37C, the laser light 11 other than the laser light 11 reflected at the surface passes through the light shielding elements 37A to 37C, and is hardly absorbed. In this situation, if the light shielding elements 37A to 37C are placed to be inclined with respect to the optical axis at a suitable angle, the components reflected at the surfaces of the light shielding elements 37A to 37C increase while the components incident thereon reduces, and therefore absorption of the laser light 11 is reduced, whereby an increase in heat is further reduced. Furthermore, if total reflective coating is applied to the surfaces of the light shielding sections 49A to 49C, the undesired light 11A is reflected at high reflectivity, and it hardly happens that the light shielding sections 49A to 49C are heated. Accordingly, a rise in temperature of the gases inside the light transmitting sections 47A to 47C becomes very small, the indexes of refraction of the light transmitting sections 47A to 47C become uniform, and disturbance of the wavefront does not occur, thus making it possible to maintain the optical quality of the laser light 11 at a high grade.

Specifically, according to the present embodiment, the light shielding elements 37A to 37C are formed of a material with very low absorption rate with respect to the laser light 11, and thus a rise in temperature of the light shielding elements 37A to 37C is small, whereby the indexes of refraction of the light transmitting sections 47A to 47C become uniform and disturbance of the wavefront does not occur.

Next, the band-narrowing unit 10 according to the present embodiment will be explained in detail. A small hole 38 is provided in an outer wall of the band-narrowing box 14, and a joint 39 for connecting a pipeline is fixed thereto. One end of a purge pipeline 30 is connected to one end side of the joint 39 outside the band-narrowing box 14. The other end of the purge pipeline 30 is connected to a purge cylinder 26 filled with an inert gas such as, for example, nitrogen (N2) via a purge valve 27. When the purge valve 27 is opened, the inert gas inside the purge cylinder 26 is always supplied into the band-narrowing box 14, and expels air inside the band-narrowing box 14 to make it possible to maintain the inside clean. This is called the purge by the inert gas.

One end of a spraying pipeline (spraying means) 40 is connected to the other end side of the joint 39 inside the band-narrowing box 14. The other end of the spraying pipeline 40 branches into two, which are fixed to portions near the light shielding elements 37A and 37B, respectively. As a result, when the purge is performed, the inert gas is sprayed to the light transmitting sections 47A and 47B of the light shielding elements 37A and 37B.

Accordingly, even if the inner edges 50A and 50B of the light shielding sections 49A and 49B are heated, the gases inside the light transmitting sections 47A and 47B are always exhanged, and therefore a temperature difference between the gases near a center of the light transmitting sections 47A and 47B and the gases near the inner edges 50A and 50B is reduced. Accordingly, the indexes of refraction at the light transmitting sections 47A and 47B become uniform, and it hardly happens that the wavefront of the laser light 11 is distorted as in the prior art. Specifically, the laser light 11 is maintained at a high grade.

In the present embodiment, it is explained that the spraying pipeline 40 is placed only near the first and the second light shielding elements 37A and 37B, but it is further preferable to place the spraying pipeline 40 near the third light shielding element 37C to spray the inert gas thereto.

Further, it is further preferable to cool the inert gas by cooling means not shown and spray it to the light shielding elements 37A to 37C, because a rise in temperature of the light shielding elements 37A to 37C is reduced.

Figure 2:
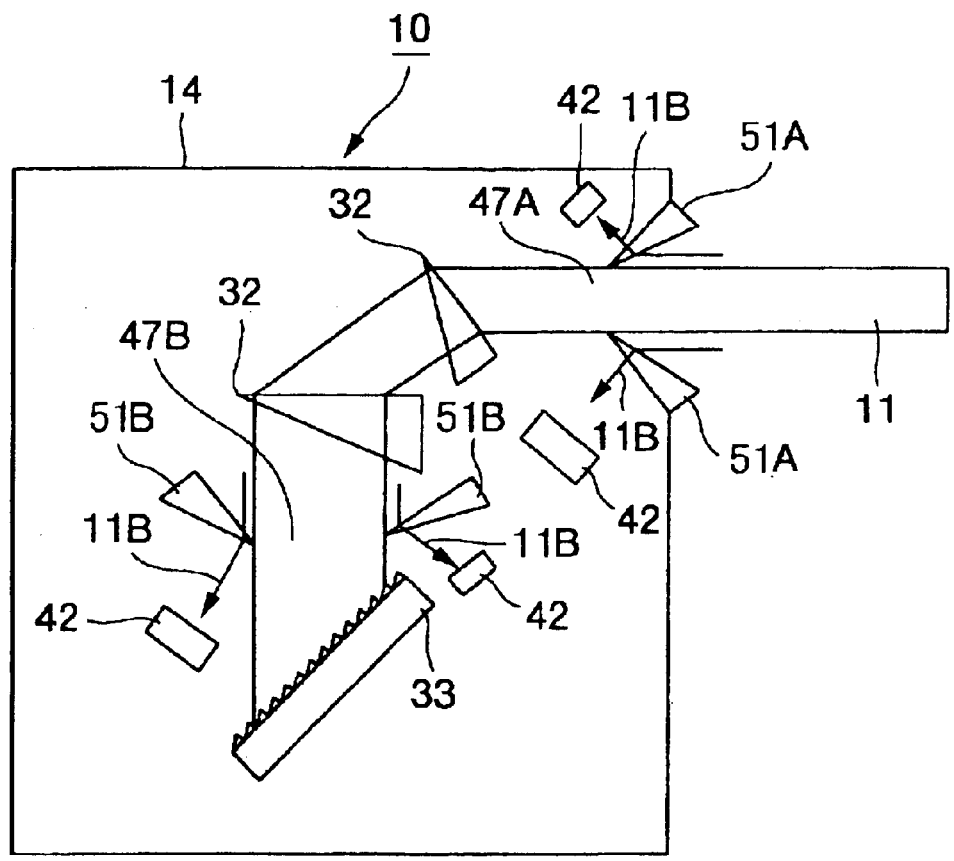
FIG. 2 is an explanatory block diagram of an excimer laser device according to a second embodiment of the present invention.

Next a second embodiment of the present invention will be explained. FIG. 2 shows a constitution of the band-narrowing unit 10 according to the present embodiment.

In FIG. 2, each of light shielding elements 51A and 51B comprises two prism-shaped optical components, which constitute a slit having a predetermined gap between them by placing vertical angles of this prism shapes opposite each other to face each other. These slits determine the light transmitting sections 47A and 47B, and the prism sections have the same functions as the light shielding sections 49A and 49B in FIG. 8. The light shielding elements 51A and 51B are constitutted by a material which transmits laser light of a wave length of an ultraviolet ray, such as synthetic fused silica, CaF2, MgF2, and the like.

Specifically, undesired laser light 11B radiated to the light shielding elements 51A and 51B is refracted inside the prisms, has a direction to deviate from an optical axis, and is emitted from the light shielding elements 51A and 51B. It is radiated to the absorbing member 42 made of aluminum, then irregularly radiated at the surface of the absorbing member 42, and absorbed in the inner wall of the band-narrowing box 14. Thereby, the beam width of the laser light 11 is restricted so that the laser light has only the components passing through the slit sections which are expressed by the light transmitting sections 47A and 47B.

In this situation, the light shielding elements 51A and 51B are composed of the material which does not absorb the undesired laser light 11B, and therefore it is extremely rare that they are heated even if they are radiated with the undesired laser light 11B. Consequently, ununiformity in temperature does not occur to the gases inside the light transmitting sections 47A and 47B, and the indexes of refraction of the light transmitting sections 47A and 47B become uniform. Accordingly, disturbance of the wavefront does not occur even if the laser light 11 passes through the light transmitting sections 47A and 47B, and therefore it is possible to maintain the optical quality of the laser light 11 at a high grade.

The slits are formed by placing the vertical angle portions of the prism shapes in FIG. 2, but this is not restrictive, and it is also suitable to place, for example, right angle portions or other vertical portions opposite each other to form the slits.

Further, in order to remove the undesired laser light B incident on the grating 33 at the angles other than a predetermined incident angle, the structure in which only one side of the optical path is shielded by one prism for each may be adopted instead of constructing the slit-shaped light transmitting sections 47A and 47B by the combination of two prisms for each.

Alternatively, not only two prisms are placed opposite each other, but also, for example, four prisms are combined to be placed at an upper, lower, left and right side to constitute the light shielding elements 51A and 51B so that the light transmitting sections 47A and 47B are in a rectangular form. Consequently, though the slit restricts only a beam width in one direction, a beam width can be also restricted with respect to another direction perpendicular to the one direction, thus making it possible to remove the undesired laser light 11B with reliability. Specifically, the undesired laser light 11B can be prevented from returning to the laser chamber 2 with more reliability.

Alternatively, instead of combining two or four prisms independently as described above, it may be suitable to make optical components in such forms in advance and place them in a predetermined position. In this manner, the size accuracy of the light transmitting sections 47A and 47B is made more precisely as compared with the constitution in which the light shielding elements 51A and 51B are placed opposite each other. Accordingly, it is possible to remove the undesired laser light 11B with more reliability, and the optical quality of the laser light 11 improves.

In the second embodiment, only the first and second light shielding elements 51A and 51B are explained, but it is suitable to adopt the same constitution as the first embodiment, in which a third light shielding element (not shown in FIG. 2) is provided as in the constitution explained in FIG. 1, that is, the constitution in which the third light shielding element 37C is provided between, for example, the front mirror 8 and the laser chamber 2.

Further, nonreflective coating may be applied onto a surface of the light shielding element 51, which the undesired laser light 11B passes through. According to this, reflection of the undesired laser light 11B at the light shielding element 51 can be reduced, and the reflected light is prevented from mixing into the laser light 11 to reduce its influence. Accordingly, the undesired laser light 11B can be removed with more reliability, and the optical quality of the laser light 11 improves.

Figure 3:
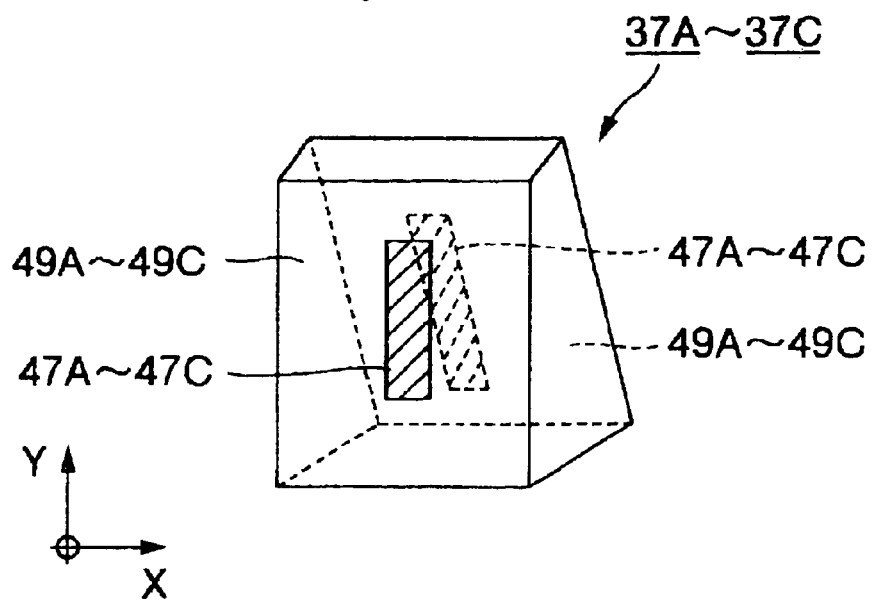
FIG. 3 is a perspective view of a light shielding element according to a third embodiment of the present invention.

Next, a third embodiment of the present invention will be explained. FIG. 3 is a perspective view showing forms of the light shielding elements 37A to 37C according to the present embodiment.

In FIG. 3, the light shielding elements 37A to 37C are formed of a material which transmits the laser light 11 with a wavelength of an ultraviolet ray, such as synthetic fused silica, CaF2, and MgF2. Rectangular nonreflective coating for preventing reflection of the laser light 11 is applied to one side surface (for example, the surface of the front side in FIG. 3) and the other side surface of each of the light shielding elements 37A to 37C, as shown by the oblique lines. Further, except for the nonreflective coating sections, that is, the light transmitting sections 47A to 47C, total reflection coating for reflecting the laser light 11 at high reflectivity is applied to both faces of the light shielding elements 37A to 37C. It may be suitable to extend the nonreflective coating sections of the light shielding elements 37A to 37C further in the Y-direction in FIG. 3 and form them into a slit shape.

If the light shielding elements 37A to 37C described above are placed in, for example, the excimer laser device 1 as shown in FIG. 1, the laser light 11 radiated to the portions to which the nonreflective coating is applied passes through the light shielding elements 37A to 37C to be the rectangular laser light 11. The undesired laser light 11A radiated to the portions to which the total reflection coating is applied, other than the above, is reflected at high reflectivity, and is radiated to the absorption material 42 as shown in FIG. 1. Specifically, the portions to which the nonreflective coating is applied become the light transmitting sections 47A to 47C, and the portions to which the total reflection coating is applied become the light shielding sections 49A to 49C.

Alternatively, in this situation, instead of applying the nonreflective coating to the light transmitting sections 47A to 47C, it may be suitable to place the light shielding elements 37A to 37C to form a Brewster's angle with respect to the optical axis of the laser light 11. Thereby, it is possible to minimize loss when the laser light 11 passes through the light transmitting sections 47A to 47C.

It is preferable to make one side faces and the other side faces of the light shielding elements 37A to 37C not to be parallel with each other. Inclining the one side face with respect to the other side face like this is called "providing a wedge". This is for the purpose of avoiding the phenomenon in which the laser light 11 is repeatedly reflected between the one side faces and the other side faces of the light shielding elements 37A to 37C and return to the laser chamber 2.

Further, it may be suitable to apply the nonreflective coating and the total reflection coating to the one side face as shown in FIG. 3 and apply the nonreflective coating to the entire surface of the other side face. Specifically, it may be suitable to make only the one side faces perform the function as the light shielding elements 37A to 37C. According to this, it is sufficient to align the positions of only the one side faces of the light transmitting sections 47A to 47C with accuracy, and it is not necessary to aligning both the one side faces and the other side faces, thus simplifying coating treatment and alignment of the optical axis.

As described above, according to the third embodiment, the light shielding elements 37A to 37C are formed of the material with large transmissivity for the laser light 11, such as CaF2 and the like, and the nonreflective coating is applied to the light transmitting sections 47A to 47C, and the total reflection coating is applied to the light shielding sections 49A to 49C outside them. Thus, the laser light 11 radiated to the light transmitting sections 47A to 47C passes through the light shielding elements 37A to 37C without loss. Further, the undesired laser light 11A radiated to the light shielding sections 49A to 49C is reflected at high reflectivity by the total reflection coating.

Accordingly, even if the laser light 11 is radiated to the light shielding elements 37A to 37C, it is not absorbed therein, and therefore the temperature of the light transmitting sections 47A to 47C does not rise. In addition, since the light transmitting sections 47A to 47C are constituted by the solid with large transmissivity, gases generating temperature gradient do not exist, and therefore the indexes of refraction of the light transmitting sections 47A to 47C do not become nonuniform. Accordingly, disturbance of the wavefront does not occur when the laser light 11 passes through the light transmitting sections 47A to 47C, thus making it possible to maintain the optical quality of the laser light 11 at a high grade.

In this situation, instead of applying the nonreflective coating to the light transmitting sections 47A to 47C, it may be suitable to place the light transmitting sections 47A to 47C to form a Brewster's angle with respect to the optical axis of the laser light 11. According to this, the transmissivity of the light transmitting sections 47A to 47C also increases, and thus the same effect can be obtained.

Figure 4:
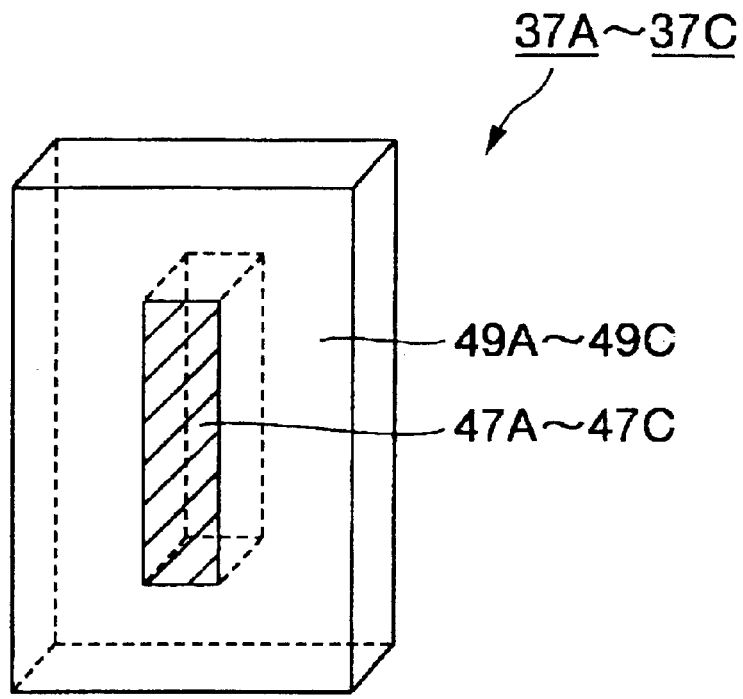
FIG. 4 is a perspective view showing another first example of a light shielding element according to the present invention.

FIG. 4 shows another first example of the light shielding elements 37A to 37C. Specifically, the light shielding elements 37A to 37C include the light shielding sections 49A to 49C of a material (aluminum alloy, copper, or the like) with large heat conductivity, each having a rectangular opening, similar to what is explained in the first embodiment. A member constituted by materials for transmitting the laser light 11 with the wavelength of the ultraviolet ray, such as synthetic fused silica, CaF2, and MgF2 is embedded in the opening to define the light transmitting sections 47A to 47C. The nonreflective coating is applied to the member defining the transmitting sections 47A to 47C, and it is preferable to provide a wedge though it is not shown in FIG. 4.

The undesired laser light 11A radiated to the light shielding elements 37A to 37C like this is reflected by the light shielding sections 49A to 49C having large heat conductivity, with substantially none of it being absorbed therein. In addition, since the light transmitting sections 47A to 47C are solid as described above, such gases as generate temperature gradient do not exist, and thus it never happens that the indexes of refraction of the light transmitting sections 47A to 47C become nonuniform. Accordingly, the wavefront of the laser light 11 is not distorted, and it is possible to maintain the optical quality at a high grade.

Figure 5:
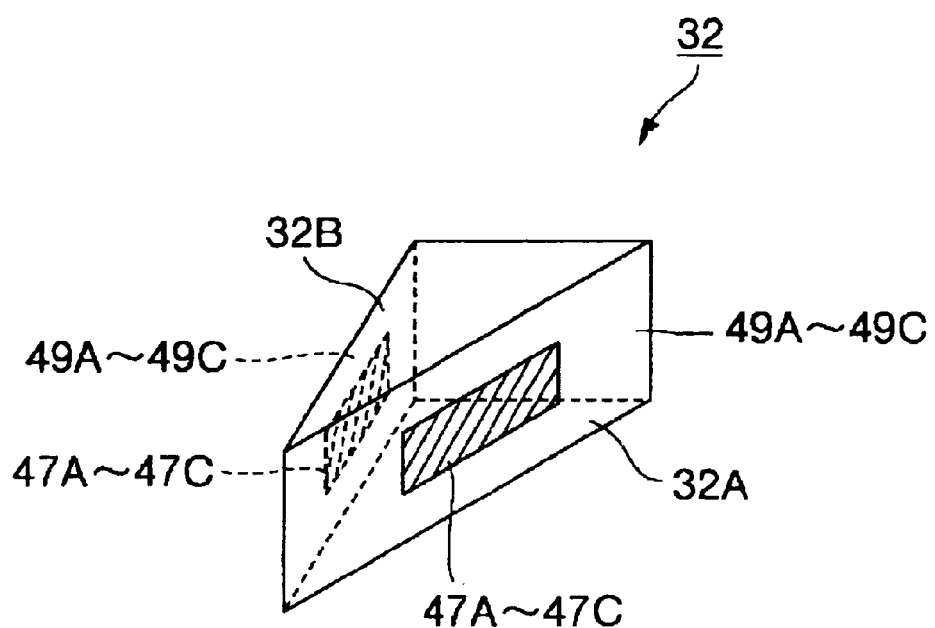
FIG. 5 is a perspective view showing another second example of the light shielding element according to the present invention.

Further, FIG. 5 shows another second example of the light shielding elements 37A to 37C. As shown in FIG. 5, rectangular nonreflective coating is applied to the prism 32 constituting the band-narrowing unit 10, at predetermined positions substantially in center portions of an incident surface 32A on which the laser light 11 is incident and an emission surface 32B on which the light 11 is emitted, respectively. Further, the total reflection coating is applied to the entire surface of the incident surface 32A and the emission surface 32B of the prism 32 except for the portions coated with the nonreflective coating.

When the laser light 11 is radiated to the prism 32 as described above, the laser light 11 which is radiated to the portion to which the nonreflective coating is applied is incident on the prism 32, in the same form as the portion to which the nonreflective coating is applied. Specifically, the incident surface 32A of the prism 32 with the nonreflective coating being applied defines each of the light transmitting sections 47A to 47C. Meanwhile, the undesired laser light 11A which is radiated to the portion with the total reflection coating being applied is reflected and removed from the optical path, and is radiated to the absorbing member 42 and the like not shown. Specifically, the incident surface 32A of the prism 32 with the total coating being applied defines each of the light shielding sections 49A to 49C.

By applying the coating to the prism 32 for expanding the laser light 11 as described above, it is possible to make the prism 32 perform functions of a light shielding element as well. Thereby, it is not necessary to additionally provide the light shielding elements 37A to 37C, and the number of components reduces, thus simplifying the structure of the device. Further, adjustment of the positions at which the light shielding elements 37A to 37C are placed is not required, and thus assembly adjustment of the excimer laser device 1 is simplified.

Figure 6:
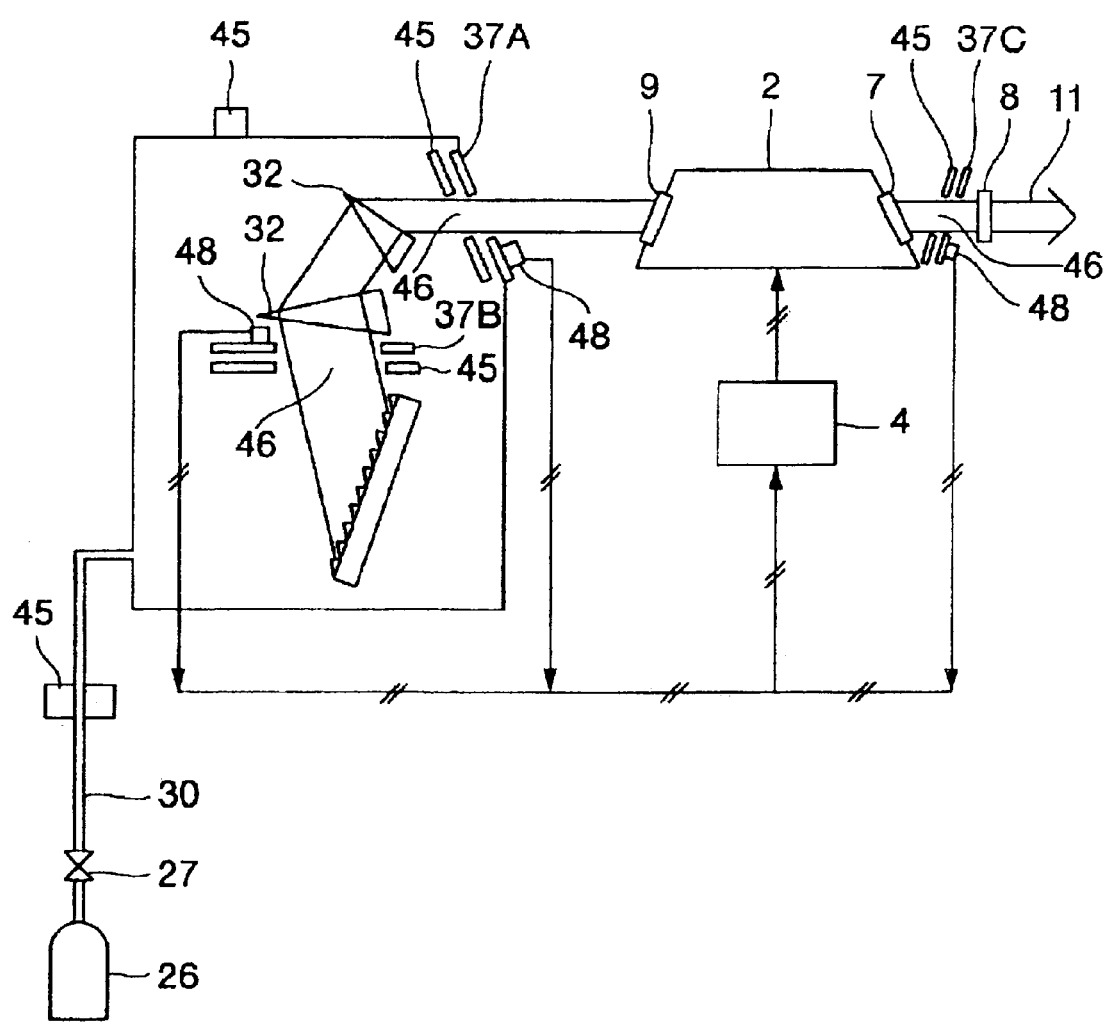
FIG. 6 is an explanatory block diagram of an excimer laser device according to a fourth embodiment of the present invention.
Figure 7:
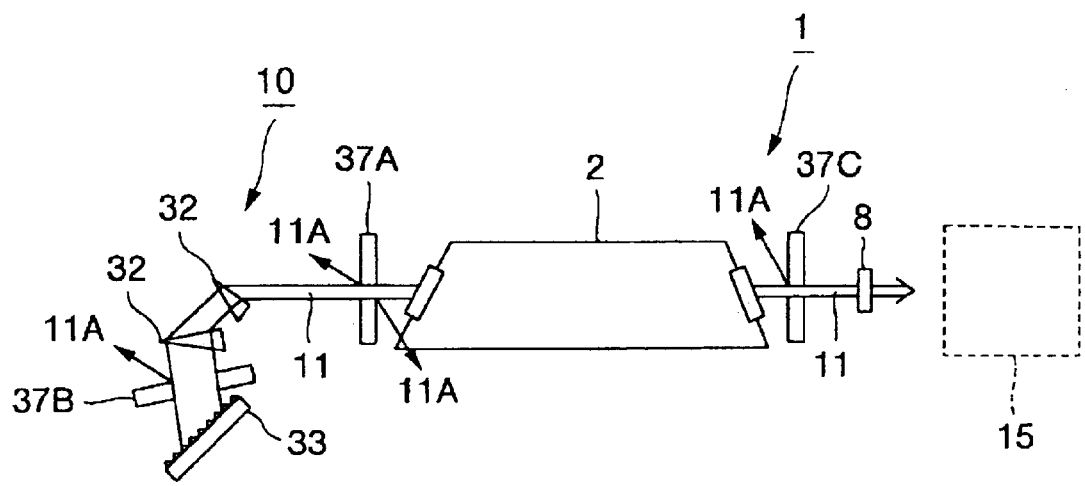
FIG. 7 is an explanatory block diagram of an excimer laser device according to a prior art.

Next, a fourth embodiment will be explained. FIG. 6 shows the constitution of the excimer laser device 1 according to the fourth embodiment. In FIG. 6, the excimer laser device 1 includes a laser controller 4 for controlling oscillation. The light shielding elements 37A to 37C are the same as shown, for example, in the first embodiment.

Heaters 45 having openings 46 for transmitting the laser light 11 substantially in the same form as the light shielding elements 37A to 37C are placed in the vicinity of the light shielding elements 37A to 37C, respectively. The laser light 11 passes through the openings 46 of the heaters 45 after it passes through the light transmitting sections 47A to 47C. Electric power is supplied to the heaters 45 from a feeder line not shown to heat the area in the vicinity of the light shielding elements 37A to 37C. As a result, the temperature of the gases inside the light transmitting sections 47A to 47C rises subsequently uniformly, and therefore the effect of heating of the inner edges 50A to 50C decreases when the laser light 11 is radiated. Consequently, the temperature gradient of the gases becomes gentle in subsequently the center portion of the light transmitting sections 47A to 47C and in the vicinity of the inner edges 50A to 50C.

Accordingly, ununiformity of the refractive indexes in the light transmitting sections 47A to 47C is less, and disturbance of the wavefront does not occur when the laser light 11 passes through the light transmitting sections 47A to 47C, thus making it possible to maintain the optical quality of the laser light 11 at a high grade.

It is preferable to also perform such heating when the excimer laser device 1 is not oscillated. Specifically, by preheating the gases of the light transmitting sections 47A to 47C, the indexes of refraction of the light transmitting sections 47A to 47C become substantially uniform, and thus it never happens that the light shielding elements 37A and 37C are rapidly heated when the laser oscillation is started. Accordingly, the optical quality of the laser light 11 can be maintained at a high grade from the time immediately after the oscillation.

Further, as shown in FIG. 6, temperature measuring devices 48 are placed in the vicinity of the light transmitting sections 47A to 47C, and measure the temperatures of the gases of the light transmitting sections 47A to 47C. The temperature measuring device 48 informs the laser controller 4 that the temperature of the gases reach a predetermined value by heating. The laser controller 4 starts laser oscillation based on this information. As a result, laser oscillation can be performed in the state in which the temperatures reaches the predetermined value or more and the indexes of refraction of the light transmitting sections 47A to 47C are always substantially uniform, and thus the wavefront of the laser light 11 is not disturbed. The laser controller 4 may receive only temperature information from the temperature measuring device 48 and may determine the start of the laser oscillation based on the information.

As another example for heating the light shielding elements 37A to 37C, the heater 45 is provided at the halfway of the purge pipeline 30 for purging a clean inert gas into the band-narrowing box 14 as shown in FIG. 6. Specifically, by purging the inert gas warmed by the heater 45, the temperature inside the band-narrowing box 14 is increased uniformly. Accordingly, even if the inner edges 50A to 50C of the light shielding elements 37A to 37C are heated at the time of laser oscillation, the gases inside the light transmitting sections 47A to 47C are warmed in advance, and therefore gradient occurring to the temperature of the gases is small. Specifically, the indexes of refraction become substantially uniform, and thus the wavefront of the laser light 11 is not disturbed. Further, the heater 45 as described above may be provided in contact with a cover (not shown) for covering the optical path of the laser light 11 and an outer wall of the band-narrowing box 14, or it may be provided inside them.

As explained above, according to the fourth embodiment, heating means such as the heaters 45 or the like are provided in the vicinity of the light shielding elements 37A to 37C, and heat the light transmitting sections 47A to 47C of the light shielding elements 37A to 37C. Accordingly, even if the temperature of the light shielding elements 37A to 37C is increased as a result of the laser light 11 is radiated, large gradient does not occur to the temperature of the gases inside the light transmitting sections 47A to 47C. Specifically, since the indexes of refraction become substantially uniform, the wavefront of the laser light 11 passing through the light transmitting sections 47A to 47C does not disturb, thus making it possible to obtain the laser light 11 at a high grade.

In each of the above embodiments, the explanation is made with the light shielding element being in a rectangular form or a slit form, but this is not restrictive. Specifically, a form such as a pin hole may be suitable. Alternatively, the form which shields only one side of the laser light as described above may be suitable.

Further, it is described that the first to the third light shielding elements are all provided inside the device, but this form is not restrictive. Specifically, the present invention is effective to the excimer laser device in which at least any one of the first to the third light shielding elements is provided. Further, the second light shielding element provided in the band-narrowing box is not limited to being provided at only one spot, and there is the case in which it is provided at a plurality of spots.

Further, in each embodiment, it is explained that the same measures are applied to all the light shielding elements, but this is not restrictive. For example, an inert gas may be sprayed to the first light shielding element, and the second light shielding element may be constituted by a substance with a low absorption rate for the laser light as shown in the second embodiment. Further, the third light shielding element may be constituted by a substance with a low absorption rate for the laser light, and an inert gas may be sprayed thereto. Specifically, the invention described in each of the embodiments is appropriately applied to each of the light shielding elements.

Further, in each of the above-described embodiments, a KrF excimer laser device is explained as an example of the ultraviolet laser device, but this is not restrictive. For example, the present invention is effective to other excimer laser devices such as an ArF excimer laser device and the like, and ultraviolet laser devices such as an F2 laser device and the like.

INDUSTRIAL AVAILABILITY

The present invention is useful as a narrow band ultraviolet laser device which can restrict a change in temperature gradient of the light transmitting sections and maintain laser light at a high grade.

What is claimed is:

1. A narrow band ultraviolet laser device comprising light shielding elements, each light shielding element having:
    a light transmitting section constituted by an opening in said light shielding element for transmitting laser light;
    a light shielding section that surrounds said light transmitting section, to remove undesired laser light from an optical path and shape the laser light into a predetermined form; and
    heating means, in addition to laser light of the laser device, for heating gases surrounding said light shielding element to relieve ununiformity of the temperature of gases inside said light transmitting section.

2. The narrow band ultraviolet laser device according to claim 1,
    wherein said heating means also performs heating in a state in which the laser light is not oscillated.

3. The narrow band ultraviolet laser device according to claim 1 or claim 2, further comprising:
    a laser controller for controlling laser oscillation; and
    temperature measuring devices for measuring temperatures of gases inside said light transmitting sections; wherein:
    said temperature measuring devices give information regarding said temperature of the gases to said laser controller; and
    said laser controller starts laser oscillation based on said information.

4. A narrow band ultraviolet laser device comprising
    a laser chamber with a laser gas being sealed therein, light shielding elements which are in vicinities of light transmitting windows provided at both sides of said laser chamber and on an axis connecting both of said windows, and a light shielding element for shielding part of laser light transmitted through a prism inside a band-narrowing module, said light shielding elements respectively having: light transmitting sections for transmitting laser light, and light shielding sections that surround said light transmitting sections, remove undesired laser light from an optical path and shape the laser light into a predetermined form, wherein
    spraying means are provided for relieving ununiformity of the temperature of the gases inside said light transmitting sections by spraying an inert gas to the vicinity of said light shielding elements and replacing the gases in said light shielding element area.

5. A narrow band ultraviolet laser device comprising
    a laser chamber with a laser gas being sealed therein, light shielding elements which are in vicinities of light transmitting windows provided at both sides of said laser chamber and on an axis connecting both of said windows, and a light shielding element for shielding part of laser light transmitted through a prism inside a band-narrowing module, said light shielding elements respectively having: light transmitting sections for transmitting laser light, and light shielding sections that surround said light transmitting sections, remove undesired laser light from an optical path and shape the laser light into a predetermined form, wherein:
    said light shielding sections are formed of a material including at least any one of aluminum, aluminum alloy and copper,
    the light shielding sections reflect the laser light at high reflectivity, thus causing less light absorption of the light shielding elements and less rise in the temperature of the light shielding sections, and
    as a result, the light shielding sections relieve ununiformity in the temperature of the gases inside the light transmitting sections.

6. A narrow band ultraviolet laser device comprising light shielding elements having:
    light transmitting sections for transmitting laser light; and
    light shielding sections that surround said light transmitting sections, to remove undesired laser light from an optical path and shape the laser light into a predetermined form; wherein:
    said light shielding sections include a solid material which transmits laser light and total reflection coating formed on a surface of said solid material, in said solid material section, gases do not exist in the laser light area, and no refraction index distribution caused by temperature distribution of the gases is caused; and
    said total reflection coating sections have a function of removing the undesired light from the optical path by reflecting the laser light.

7. A narrow band ultraviolet laser device comprising:
    undesired laser light removing elements for removing undesired laser light from an optical path and shaping laser light into a predetermined form; and
    light transmitting sections bordered by said undesired laser light removing elements, for transmitting the laser light; wherein;
    said undesired laser light removing elements are formed of a material which transmits the laser light, thus causing less light absorption of the undesired laser light removing elements and less rise in temperature of the undesired laser light removing sections, and as a result, said undesired laser light moving elements relieve ununiformity in the temperature of the gases inside the light transmitting sections; and
    said undesired laser light removing elements have a function of refracting the laser light to remove the undesired laser light from the optical path.

8. A narrow band ultraviolet laser device comprising light shielding elements having:

light transmitting sections for transmitting laser light; and light shielding sections that surround said light transmitting sections, remove undesired laser light from an optical path and shape the laser light into a predetermined form; wherein said light transmitting sections are formed of a solid which transmits the laser light, therefore gases do not exist in the laser light area, and refraction index distribution caused by the temperature distribution of the gases does not occur.

* * * * *